United States Patent [19]

Beers et al.

[11] Patent Number: 5,519,641
[45] Date of Patent: May 21, 1996

[54] METHOD AND APPARATUS FOR CONFIGURING PLURAL MULTIMEDIA AUDIO CARDS AS A LOCAL AREA NETWORK

[75] Inventors: Gregory E. Beers, Austin; James A. Brewer, Leander; Paul R. Habermehl; James M. Stafford, both of Round Rock, all of Tex.

[73] Assignee: International Business Machines Corporation, Armonk, N.Y.

[21] Appl. No.: 246,452

[22] Filed: May 20, 1994

[51] Int. Cl.⁶ .................................................. H04L 12/28
[52] U.S. Cl. ........................... 364/514 C; 364/242.95; 364/940.62; 375/222
[58] Field of Search ..................... 364/514 A, 514 B, 364/514 C, 514 R, 242.94, 242.95, 940.62, 942.4; 370/85.1; 375/222

[56] References Cited

U.S. PATENT DOCUMENTS

| | | | |
|---|---|---|---|
| 4,578,789 | 3/1986 | Middleton | 370/58 |
| 4,955,019 | 9/1990 | Mizuhara et al. | 370/85.7 |
| 5,014,267 | 5/1991 | Tompkins et al. | 370/62 |
| 5,034,808 | 7/1991 | Murray | 358/86 |
| 5,111,451 | 5/1992 | Piasecki et al. | 370/29 |
| 5,309,564 | 5/1994 | Bradley et al. | 395/200 |
| 5,355,452 | 10/1994 | Lam et al. | 395/200 |
| 5,434,797 | 7/1995 | Barris | 364/514 A |
| 5,440,740 | 8/1995 | Chen et al. | 395/650 |

OTHER PUBLICATIONS

Crystal Semiconductor Corp., "Audio Local Area Network Transeiver", Jan. 1994, pp. 6–69 to 6–101.

*Primary Examiner*—Ellis B. Ramirez
*Assistant Examiner*—Patrick J. Assouad
*Attorney, Agent, or Firm*—Casimer K. Salys

[57] ABSTRACT

A system and method makes use of the line-in, line-out connectors for each right and left stereo channel of an audio card to provide a communications network. The distributed computers are connected in a master/slave configuration. All of the slave systems have the line-in ports, and the line-out ports, connected together. The master system line-out is connected to each slave system line-in port, and the slave system line-out ports are connected to the master line-in port, for each channel. A communications protocol is provided wherein the master system allows audio and data information to be simultaneously transferred between the master and slave systems. The master provides a clock signal and performs arbitration in order to facilitate the information transfer.

17 Claims, 11 Drawing Sheets

METHOD AND APPARATUS FOR CONFIGURING PLURAL MULTIMEDIA AUDIO CARDS AS A LOCAL AREA NETWORK

BACKGROUND OF THE INVENTION

1. Field of the Invention

The present invention relates to a distributed computing environment, wherein multiple users need the ability to interact with a particular computer program, such as a multimedia application. More specifically, the present invention provides a distributed environment, in the form of a local area network (LAN), with a master system and at least one slave system wherein users of the master and slave systems can access, and interact with each other, and an application running on either the master or slave(s) systems.

2. Description of Related Art

Many users, or potential users, of computer systems and applications operate on a limited budget. A good example of these types of users, are school systems which purchase educational computers. In many cases, it is desirable to interconnect multiple computer systems into a network in order to save money. That is, using a network allows systems on the network to operate without having expensive options, such as hardfiles, diskette drives, and other expensive options. The hardware items, such as LAN adapters and cables, needed to interconnect multiple computer systems into a LAN, are much less expensive than hardfiles and other options needed for stand alone systems. Further, it is often cheaper to license a single copy of a program application with multiple users, than multiple individual copies of the same program.

Unfortunately, these budget concerns apply with equal weight to multimedia systems, which are excellent teaching tools. Multimedia applications combine text, graphics and audio which can maintain a student's attention and create a positive learning environment. However, due to budget constraints most school systems will not be able to purchase the number of computer systems needed to allow their students adequate access to these multimedia, or other learning programs. Generally, schools will either purchase a single multimedia system to be shared among many students providing less than ideal learning conditions, or delay the purchase of these multimedia computer systems, until more funds are available which will deny current students access to some excellent interactive learning tools. Therefore, it can be seen how a system which provides a low cost LAN would be desirable, since it would allow school systems, or any other group or organization having multiple users, to interconnect multiple inexpensive computer systems into a network. While, distributed computer systems configured as a local area network are currently available, these systems can be very expensive rendering them cost prohibitive to many potential users. In contrast, the present invention connects the audio input and output of these relatively inexpensive audio cards to configure a plurality of computer systems as a local area network, capable of simultaneously processing both data and audio information.

Audio adapter cards are currently known which generally include a digital signal processor (DSP), digital to analog converter (DAC), analog to digital converter (ADC), musical instrument digital interface (MIDI), storage buffers, and the like. These audio cards are generally used to process digitally captured audio files for playback to a user, or the like. Both right and left stereo channel input and outputs are provided on standard audio cards.

U.S. Pat. No. 4,955,019 is a digital exchange network wherein channels are selectively assigned for communication among a plurality of subscriber systems having line terminating equipment. This invention permits simultaneous multiple communications between multiple pairs of terminal devices exchanging request information to establish communication sub-channels. U.S. Pat. No. 5,034,808 describes a video and audio signal control and distribution system which allows either a radio signal, video tape audio track signal or a microphone to be selected based on a hierarchical signal arrangement. Further, U.S. Pat. No. 5,014,267 discusses a communications network for interfacing between remote video terminals. The network includes a switch which receives audio and video information. Separately, a centralized controller is used to receive data from the remote terminals via a communications link.

It can be seen that none of these references disclose any type of local area network system configured using interconnected audio cards which simultaneously transmit audio and data information over the right and left stereo channels on the cards.

SUMMARY OF THE INVENTION

In contrast to the prior art, the present invention provides a system and method that allows computers to be configured as a LAN through the use of an audio card, cables and novel communications protocol.

Broadly, the invention makes use of the line-in, line-out connectors for each right and left stereo channel of the audio card to provide a communications network. Further, audio and data information can be transmitted simultaneously over the LAN of the present invention. The distributed computers are connected in a master/slave configuration. All of the slave systems have their line-in ports connected together, and the master system line-out will be connected to the slave system line-in ports, for each channel. All of the slave systems also have their line-out ports connected together, while the master system line-in will be connected to the slave system line-out ports, for each channel. Only one slave line-out may actively transmit data at any time.

A communications protocol is provided by the present invention wherein the master system provides a clock signal on the control channel. During steady state conditions, there is no activity on the control or data channels. During communication, if either the master or slave systems recognize their address on the packet received on the line-in channel, then the information is decoded and processed by a digital signal processor (DSP) on the audio card. The audio data may be output to the system as a play file, or the like, while data information may be sent directly to the host CPU in the system (master or slave) for display on the computer screen.

When a slave system requests time on the network it contacts the master system by outputting a signal on the control line. This request signal is recognized by the master and an arbitration scheme is then used to award the network to the slave system requesting access. The master only allows a slave to hold the network for a predetermined period of time. Once this time period is exceeded the master issues a back-off command which forces the slave off the network. The master will then grant the next slave with an active request access to the network. The master system may also transfer information on the network to one or more slave systems, but does not have to arbitrate for access to the network and is not subject to a back-off command.

The present invention also contemplates a multitasking program for controlling an on-board processor on the audio card. This will allow the simultaneous transmission and/or receipt of audio and data information and audio play or record by the systems interconnected in the LAN audio configuration of the present invention.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
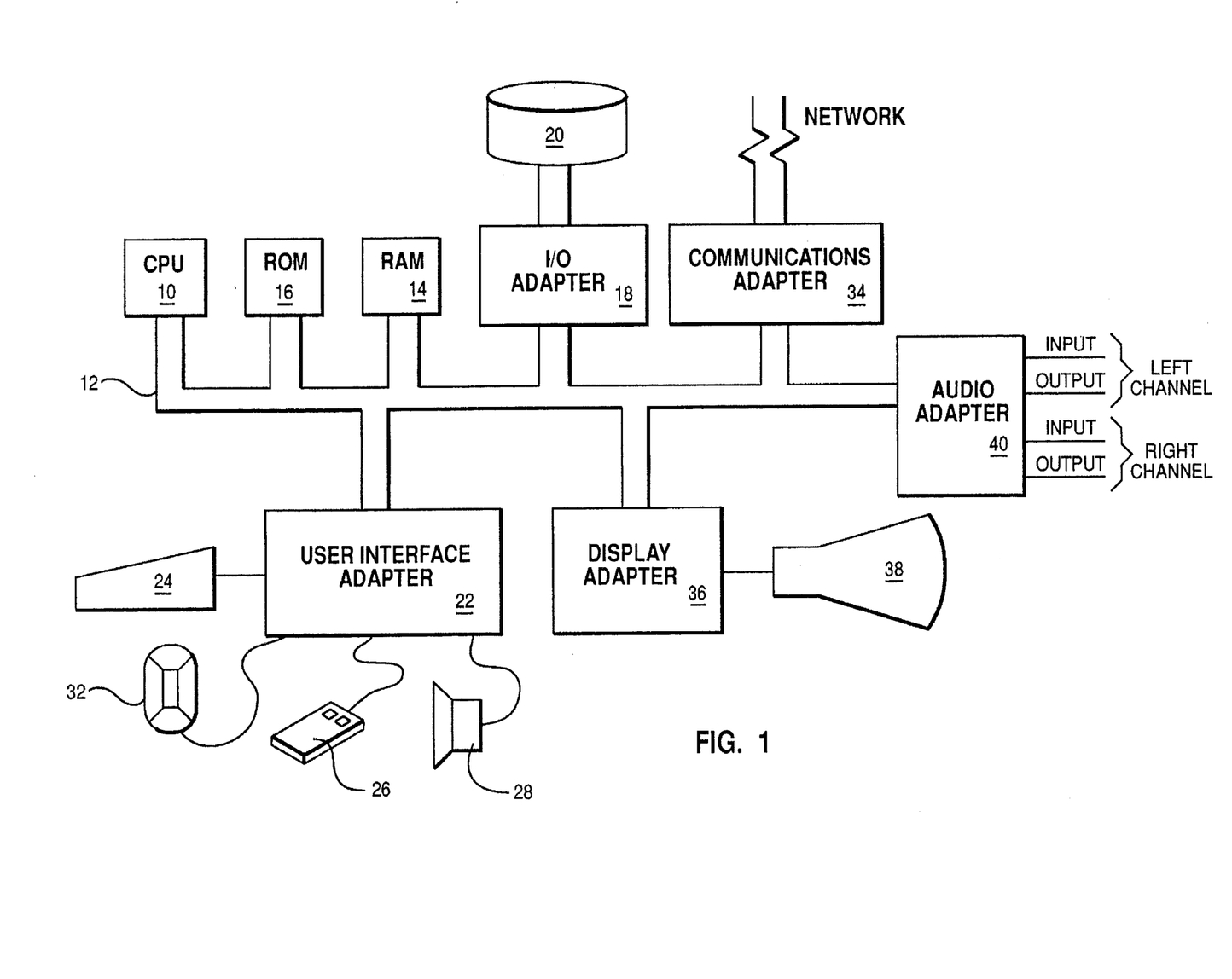
FIG. 1 is a schematic diagram representing hardware components of a typical data processing system capable of implementing the present invention.

Referring to FIG. 1, a typical data processing system is shown which may be used in conjunction with the present invention. A central processing unit (CPU), such as one of the PowerPC 6XX microprocessors available from IBM (PowerPC is a trademark of the IBM Corp.) or Intel X86 processors is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. Audio card 40 is shown connected to system bus 12 and includes right and left stereo channels, each having an input and an output. Thus, each card 40 is capable of receiving two inputs (one per channel) and providing two corresponding outputs. The system of the present invention utilizes the input and output lines of one stereo channel for data, and the other stereo channel lines for control in order to implement a local area network using interconnected audio cards 40. In this manner, a user is capable of inputting to the system through the keyboard 24, trackball 32 or mouse 26 and receiving output from the system via speaker 28 and display 38. Additionally, an operating system such as DOS or the OS/2 system (OS/2 is a Trademark of IBM Corporation) is used to coordinate the functions of the various components shown in FIG. 1.

Figure 2:
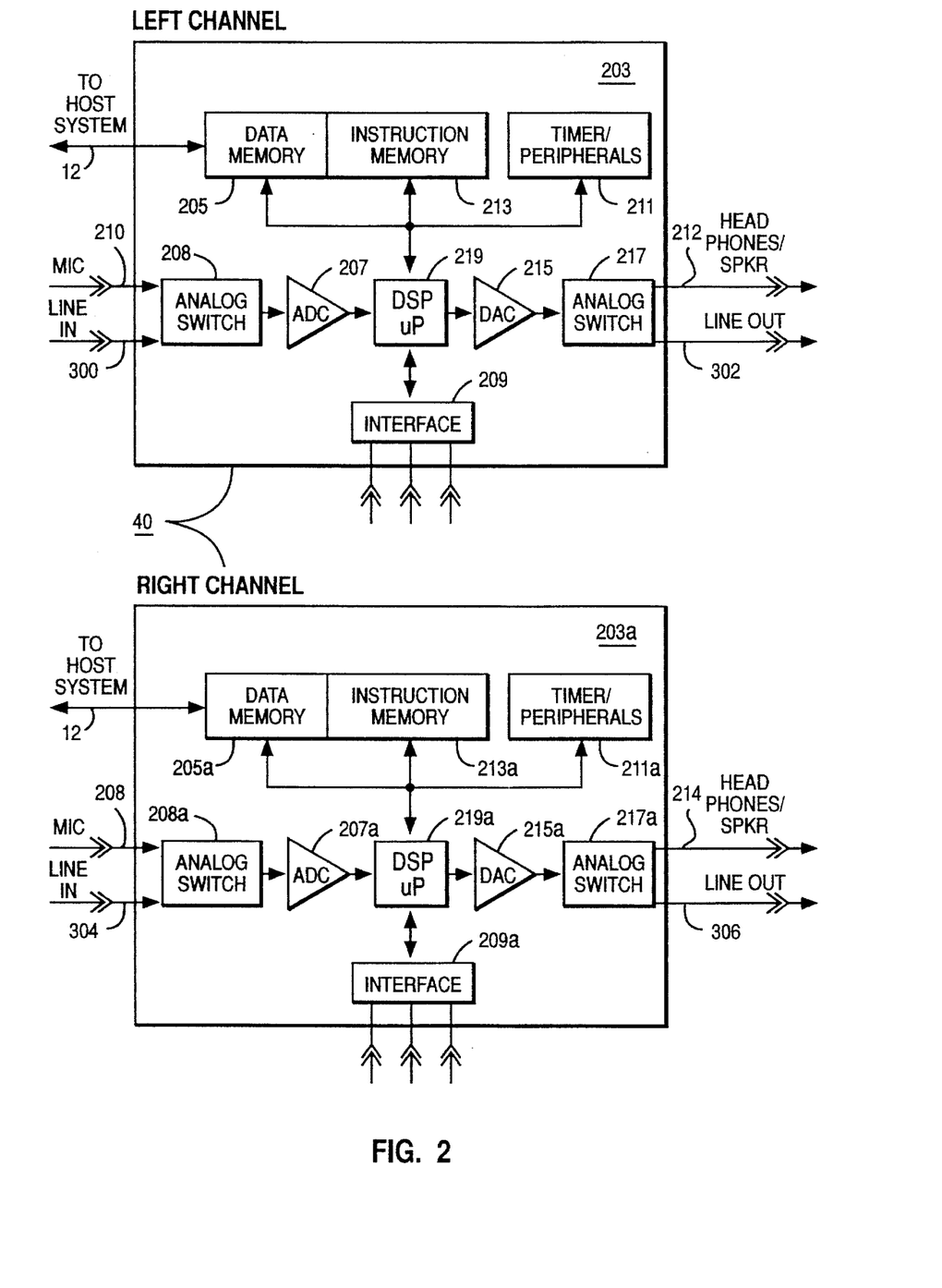
FIG. 2 is a schematic diagram of a typical audio adapter and its interconnections, capable of being utilized by the present invention, for either a slave or master system.
Figure 3:
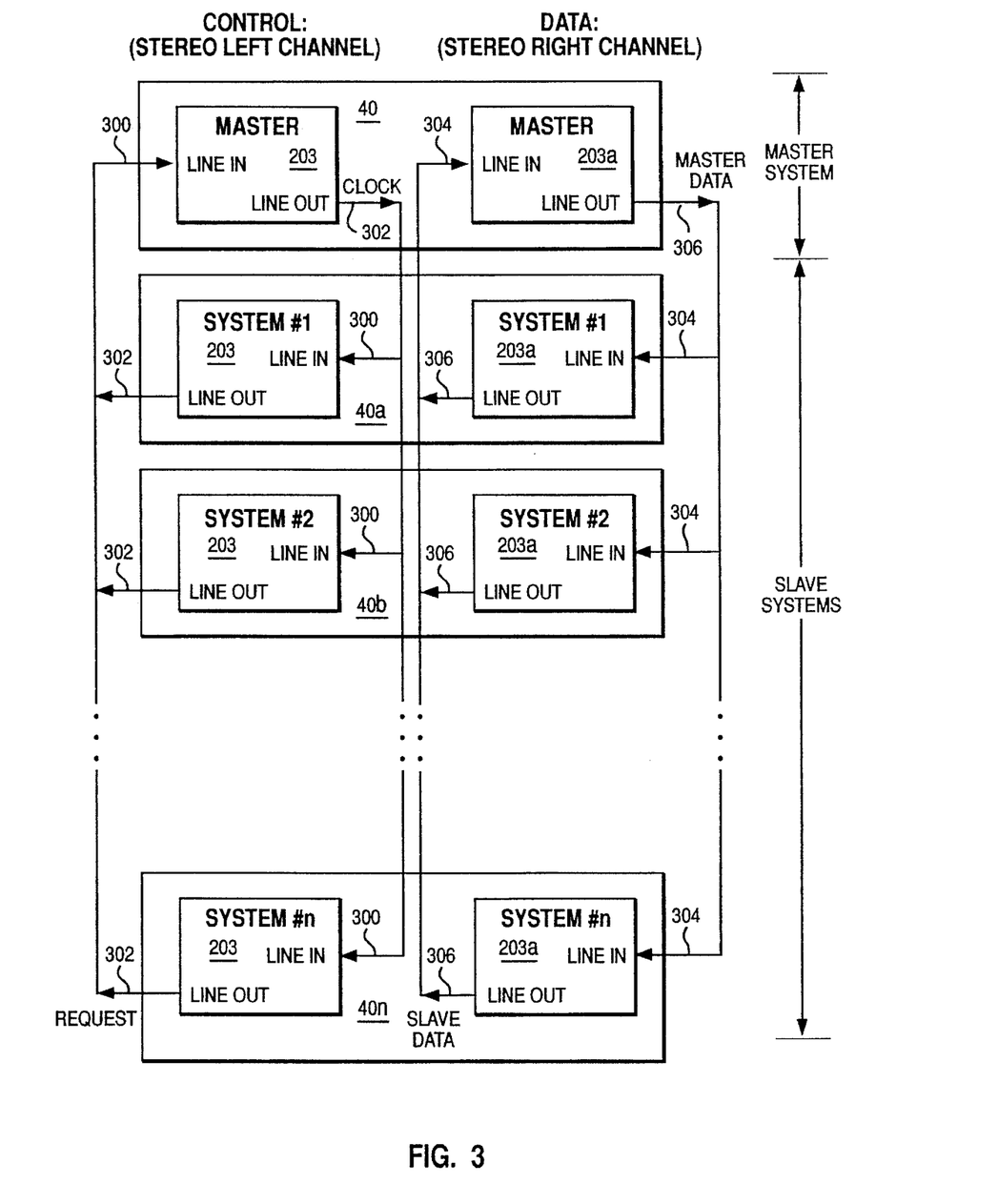
FIG. 3 is a block diagram showing the physical interconnection of the master and slave audio cards of FIG. 2 into a local area network.

FIG. 2 is a schematic diagram of an audio card contemplated by the present invention for use in either a slave or master system (see reference numerals 40a through 40n of FIG. 3). In a preferred embodiment, the "Windsurfer" Communications and Audio Adapter, from IBrd can be used to give good results. However, any commercially available audio card having an on-board processor, such as a DSP and two channels is contemplated by the present invention.

The block diagram of FIG. 2 shows the components which must be included on the audio card 40 of the present invention in order to process the audio and data information transmitted between the various master and slave systems in the LAN. More particularly, two identical circuits are shown for the right and left stereo channels on multimedia audio card 40. It should be noted that both circuits have identical components and function in the same manner. Therefore, a detailed description will only be given for a single circuit, it being apparent to one skilled in the art that both circuits 203 and 203a can be considered identical. Further, the components of circuits 203 and 203a will be noted by identical reference numerals, the exception being that an "a" is added to the circuit and components representing the right channel.

Under normal conditions, such as when the audio card is being used to process analog signals, such as when live music is being recorded, processed, amplified, or the like, analog stereo audio signals are selectively input at Line-In ports 300 and 304 or at Microphone input ports 210 and 208 into the left and right circuits, 203 and 203a, respectively. The selection of input is done by analog switch circuits 208 and 208a. The individual signals are each received by analog to digital converters (ADC) 207 and 207a and converted to digitized audio signals.

Further, in a preferred embodiment of the present invention, the host computer system as shown in FIG. 1 is interconnected to a memory 205 and 205a such that the contents of a digital multimedia play file can be input from memory 14, or the like, to memory 205, 205a on the audio card 40 for processing. This file may consist of music, verbal text, or any other digital audio information that is part of a multimedia presentation. In particular, an interactive audio educational program is contemplated by the present invention, wherein students may be required to respond to specific questions in order to supplement the material they have learned from a classroom instructor. The digital audio information two-channel play file from the host system is input and stored in memories 205 and 205a. It should be noted that the host system as used herein refers to the computer on which the audio card 40 is installed and contemplates host systems including both the master and slave systems. Memories 205 and 205a are RAMs and used as buffers in order to store the digital play file information before it is processed. Timers 211 and 211a are present to coordinate the loading of the play file data from the memories into digital signal processors (DSP) 219 and 219a, as well as providing overall coordination of the audio processing. Of course, those skilled in the art will understand that data may be output from DSP 219 and 219a via memories 205 and 205a to the host system for display, or play back in the case of audio information. It should be noted that, for the sake of simplicity, two digital signal processors are shown in FIG. 2, one for each channel. However, those skilled in the art will understand that a single DSP is capable of providing processing functions for both the left and right channels, and is contemplated by the scope of the present invention.

Additional memories 213 and 213a are RAM which has been loaded by the system and used in the system of the present invention to store additional data and/or instructions which may be required for simultaneously processing audio and data information by DSP 219 and 219a in accordance with the present invention. Memories 205 and 213 (or 205a and 213a) may be a single memory unit, e.g. chip, with separate loadable areas for the audio data and instructions, or two (or more) individual memories that are connected in parallel. Reference numerals 209 and 209a represent an interface that allows digital audio data processed by the DSP(s) to be output, as well as digital input from musical instruments and other audio sources to be received. Many currently available audio cards 40 will include a Musical Instrument Digital Interface (MIDI) to provide the interface 209, 209a.

The digital signal processors 219 and 219a are essentially numerically intensive microprocessors, such as a model TMS320C51, commercially available from Texas Instruments, Inc. These microprocessors need to be relatively high speed so that the audio information and data can each be sampled at an acceptable frequency to allow for their simultaneous processing. That is, audio information and data which is input from other systems on the LAN must be sampled at an acceptable frequency such that the data input to the DSP is equal to data being output therefrom. Once the audio play file data is processed by DSP 219 or 219a and is ready to be output to another computer system on the LAN, the file is input to digital to analog converters 215 and 215a. DAC 215, 215a converts the processed digital file into an analog signal, which it then sends to analog switch 217 and 217a. The analog switch will send the analog signal to either the audio output device (e.g. speakers or headphones) 212 and 214 or the Line-Out 302 and 306. When the analog switch is set to send data to the Line-Out, the analog signal is then transmitted over the local area network of the present invention on signal lines 302 and 306.

The diagram in FIG. 2 may be used to represent either the master or the slave system. The hardware for both systems is identical.

FIG. 3 is block diagram showing the interconnection of plural audio cards into a LAN, as contemplated by the present invention. It can be seen that the stereo left channel is used for control, while the stereo right channel is used to transmit data. The line-out 302 of the left channel of master audio card 40 is connected to the left channel line-in 300 of the slave audio system 40a–40n. The master system provides a clock which will operate at various magnitudes and in a preferred embodiment the frequency will be at approximately 11.025 KHZ. This allows for a data rate of 88.2 KBaud which is derived from eight (8) bits per clock cycle, thereby giving 256 data levels. Each of the left channel line-out connecters 302 of the slave systems will be input to the left channel line-in port 300 of the master system.

The right stereo channel output 306 of the master system is connected to the right channel input line 304 of each slave in the LAN. The master passes data to the slaves via its line-out 306 to the slave's line-in 304. The right channel line-out 306 for each slave in the LAN is connected to the right channel line-in 304 for the master system. This path is used by the slaves to transfer data to another slave or the master. The operation of the communications protocol of the present invention will be discussed in more detail with regard to the flow charts of FIGS. 6–8.

Figure 4:
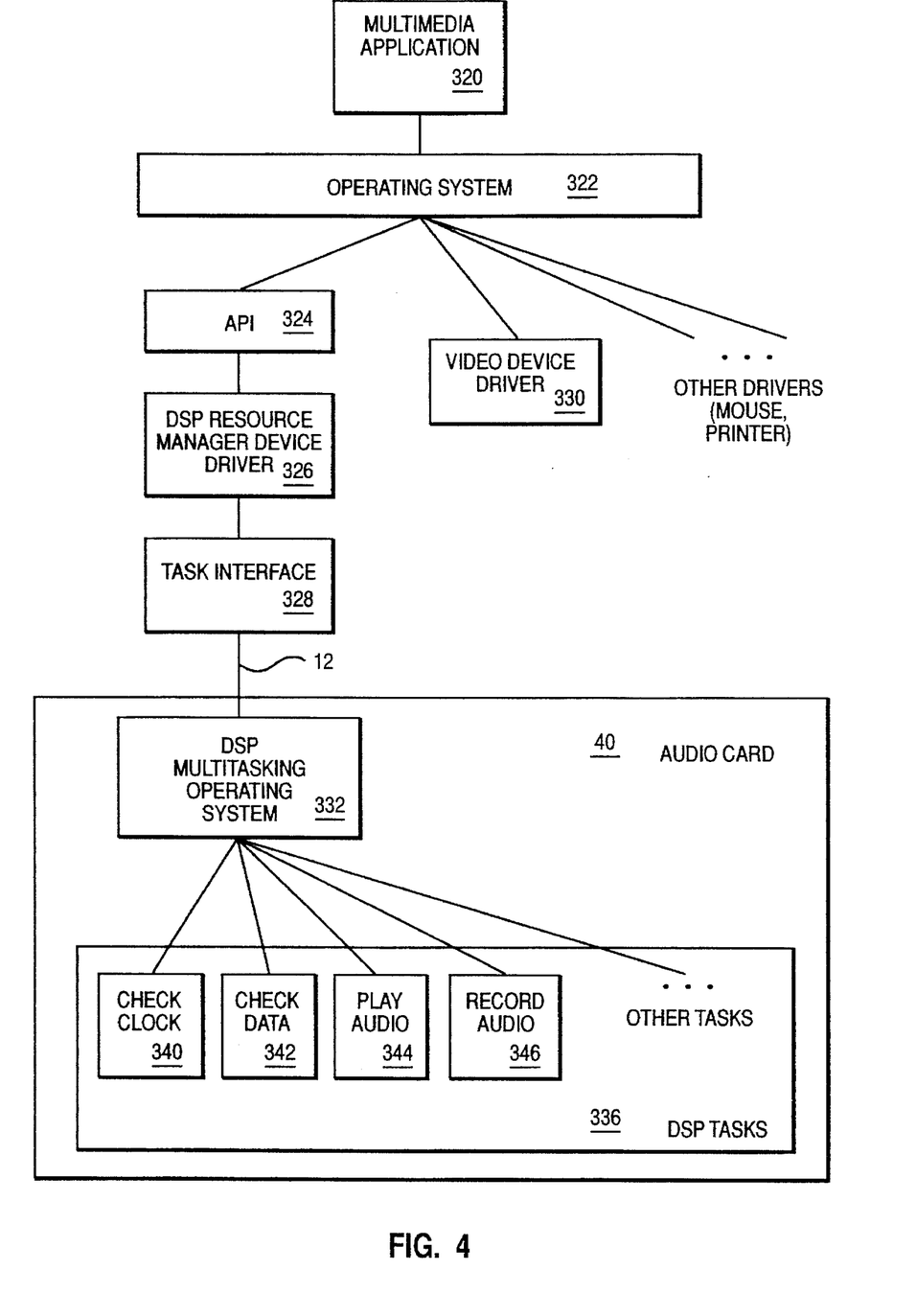
FIG. 4 is a block diagram of the software utilized by the present invention to create a LAN using computer systems having an audio card.

FIG. 4 is a block diagram showing the structure of the software components of the interconnected audio card LAN system of the present invention. Audio card 40 is shown with the modules of software which are required to support the LAN and audio functions. The multimedia application 320 interfaces with the operating system 322, such as OS/2, or the like. Beneath the operating system 322 are various software device drivers, such as a video device driver 330, mouse driver, printer driver, and the like. Also, an Application Programming Interface (API) 324 is provided to present common interfaces to either hardware or software modules which support varied personal computer or workstation functions like audio card 40. In this case API 324 provides a standard interface to the DSP resource manager device driver 326. This driver 326 provides control and data management to the audio card functions from the operating system 332 and application 320. A standard task interface 328 is another software interface layer that provides interaction between the DSP driver 326 and the DSP multitasking operating system 332 which is running on the audio card DSP 219. The DSP operating system coordinates the different DSP tasks or operations which are required to implement any high level command issued by multimedia application 320. DSP operating system 332 is a multitasking system which allows more than one operation to be implemented concurrently. This provides the present invention with the capability of processing audio and data information simultaneously. Tasks being coordinated can be audio LAN tasks related to transferring data like check clock 340, check data 342, output data, receive data, or the like. Audio related tasks which may be occurring concurrently with the data tasks include play audio 344, record audio 346, or the like, wherein the audio adapter card processes audio signals to play (output) or record (input) audio information. It can be seen that the DSP operating system 332 can simultaneously control and monitor many different tasks beyond those mentioned herein, which have been provided for the purpose of example rather than limitation.

Figure 5:
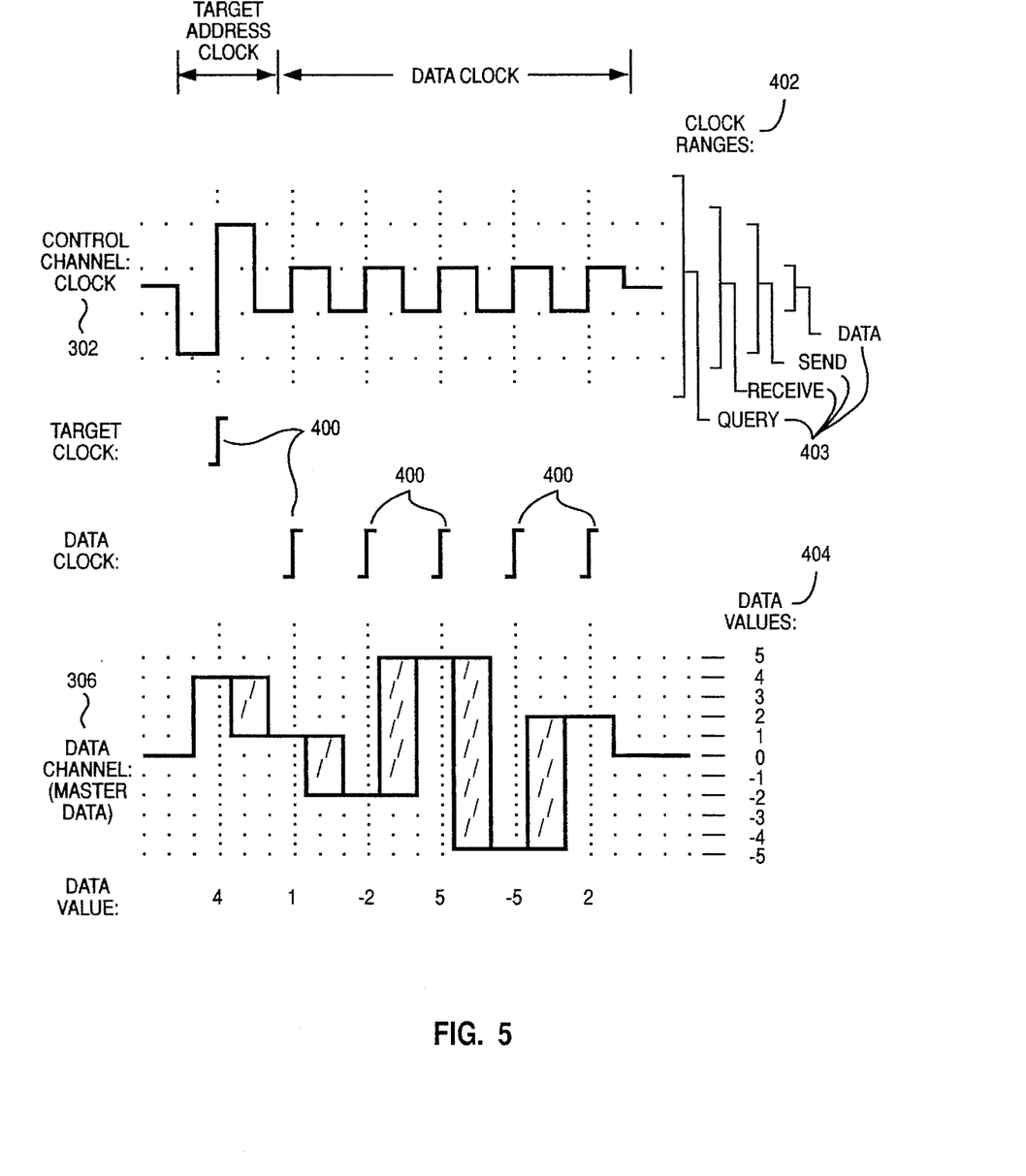
FIG. 5 is a timing diagram of the data clock provided by the master system, and the multilevel discrete encoding analog technique used by the present invention to transmit digital data over the audio network.

FIG. 5 is a pictorial representation of how the audio LAN clock and data physically operate. The control channel 302 provides the sequencing clock for data transmission. This signal is output from master system line-out 302 (FIGS. 2 and 3). The rising edge of the control channel clock signal 302 from master line-out 302 is represented by indicators 400. Data must be valid just prior to and during each rising edge of the control clock. Each new value of data is put on the channel (FIG. 3 Master Data 306) by the master audio card DSP 219 at the same time the master clock 302 goes low. Also shown is clock range 402 which is the mechanism for identifying the target system which the data is intended to serve. An identification number which has been assigned to a slave system is output by the master on the master data channel 306. This is done as the control channel clock is lowered to an extreme level, which is less than when data is normally being transferred. When the control channel clock transitions up to a certain range, i.e. target clock 400, then each slave will detect that the clock is at an extreme range. When this occurs, each slave will decode the identification number on the data channel to determine if it is being selected. The slave is selected when its identification number matches the data on the master data channel 306. This selection process can take one or more clock cycles, but will always take a predetermined number of cycles, depending on the number of slaves on the network.

At the time the control channel clock transitions to a certain range and the slaves decode the identification number, the slave will also decode the signal on the control channel 300 to determine an associated command, 403. The commands, 403 depend on the range of values 402 and include query, send data and receive data. Therefore, the control channel 300, 302 transfers commands from the master to the slave(s). In this manner, the master is able to control the slave and to cause the slave to perform various functions. The master controls the slave's actions based on the levels 402 of the control channel clock. In summary, the control channel can communicate commands to the slave, from the master, that will cause the slave to process data, perform a query operation, perform a send operation, perform a receive operation, or remain in a wait state and perform no processing by issuing commands 403.

In the case of FIG. 5, slave number 4, for example, is being selected. Following the slave selection, the data sequence 1, –2, 5, –5, 2 is sent. Completion of data is indicated by the master setting its clock (control channel) and data channel to neutral, or zero levels. Data values are multi-level, that is any one data position in time may represent multiple values. This is due to the analog nature of the audio card Line In and Line Out. As an example, FIG. 5 shows data which spans a range (404) of –5 to +5, however, many other ranges of values are contemplated by the present invention.

FIGS. 6 through 11 provide the flow of operations which is necessary for the master and slave systems to operate with one another and share data across a LAN consisting of interconnected audio cards.

Figure 6:
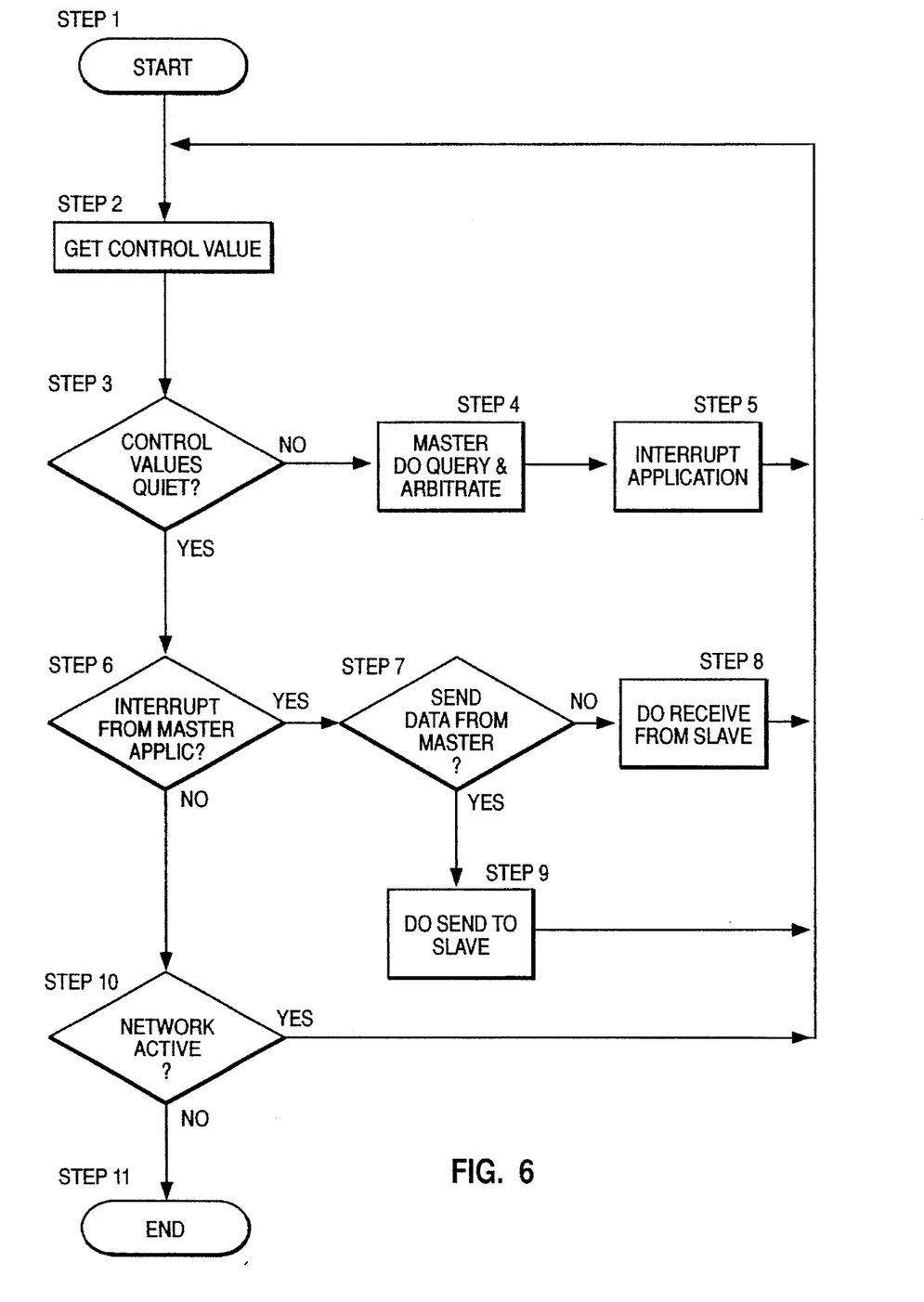
FIG. 6 is a flowchart to the operations performed by the master system when audio and data is transferred between the network.

FIG. 6 is a flowchart representing the steps implemented by the master system of the network of the present invention. At step 1 the process is started and the master checks the control value from the network at step 2. If there are no control values on the network, i.e. the control values are quiet (step 3) then step 6 determines if there is an interrupt from a program application running on the master. If, at step 3 it was determined that the control value was not quiet, i.e. a control value existed, then at step 4 the master queries each slave system (FIG. 9) and supervises an arbitration by the requesting slave. Once the requesting slave has control of the network, the application running on the master is interrupted, at step 5, and data from the slave is transmitted to the application. Subsequent to step 5, the process returns to step 2 and gets a control value. If, at step 6, it was determined that an interrupt from the application running on the master did exist, then step 7 determines if the master is to send data to a slave system. If so, then step 9 implements a send data procedure (FIG. 8) to the slave. If step 7 determines that data is to be received from the slave, then a receive data procedure (FIG. 10) is implemented (step 8). When step 6 determines that no interrupt from the master application is present then step 10 determines if the network is active and if so, the system loops back to step 2 to obtain a control value. If the network is not active, then the process ends at step 11. Subsequent to steps 8 and 9, the system also returns to step 2 to get the next control value.

Figure 7:
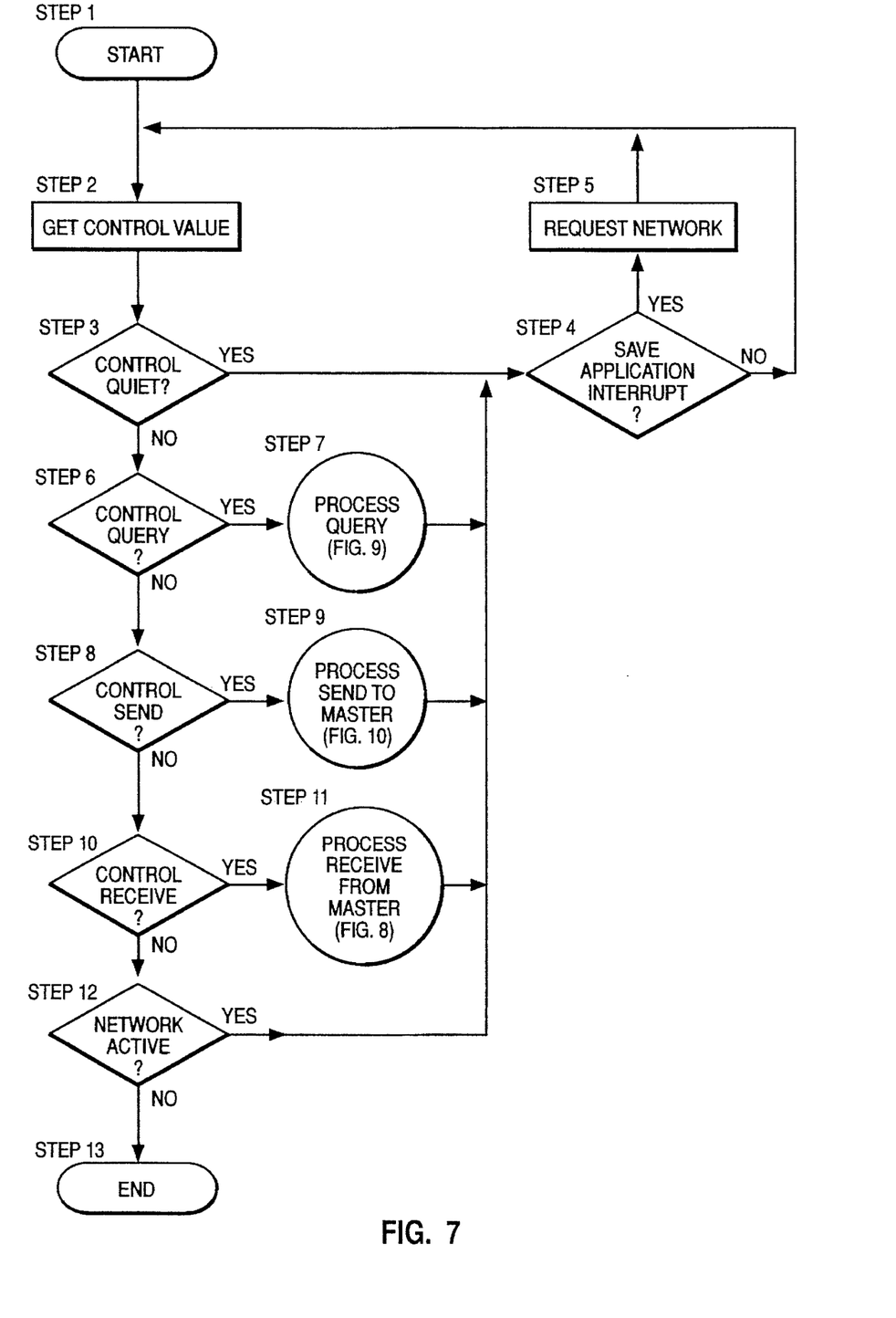
FIG. 7 is a flowchart of the overall process required for a slave system to interact with the local area network.

FIG. 7 is a flowchart illustrating the overall structure of the steps processed by a slave system when transferring data to, and receiving data from the master over the network of the present invention. At step 1 the process is started and at step 2 the slave obtains the control value from the network. At step 3 it is determined whether a control value is on the network, i.e. is the network quiet? If so, step 4 determines if a program application running on the slave system has issued an interrupt. If not, then the process loops back to step 2 where the control value is obtained. If an application running on the slave system has issued an interrupt request, then the network is requested at step 5. When it is determined by step 3 that a control value is present, i.e. the network is not quiet, then step 6 determines if the control value specifies the query command, if so, then a process query routine is run at step 7 (FIG. 9). It is then determined at step 8 if the control value indicated the send data command (this determination is made based upon the range of signals 402 shown in FIG. 5). If so, then a process send routine (FIG. 10) is implemented at step 9 to send data from the slave to the master. If step 8 finds that the control value does not indicate a send, then step 10 determines if a control receive is to occur. If so, a process receive routine (FIG. 8) is run at step 11. Step 12 determines whether the network is active, and if so, returns to step 4. If it is determined that the network is not active, then the process ends at step 13. Subsequent to the process routines of steps 7, 9 and 11 being run, the method of FIG. 7 also returns to step 4.

Figure 8:
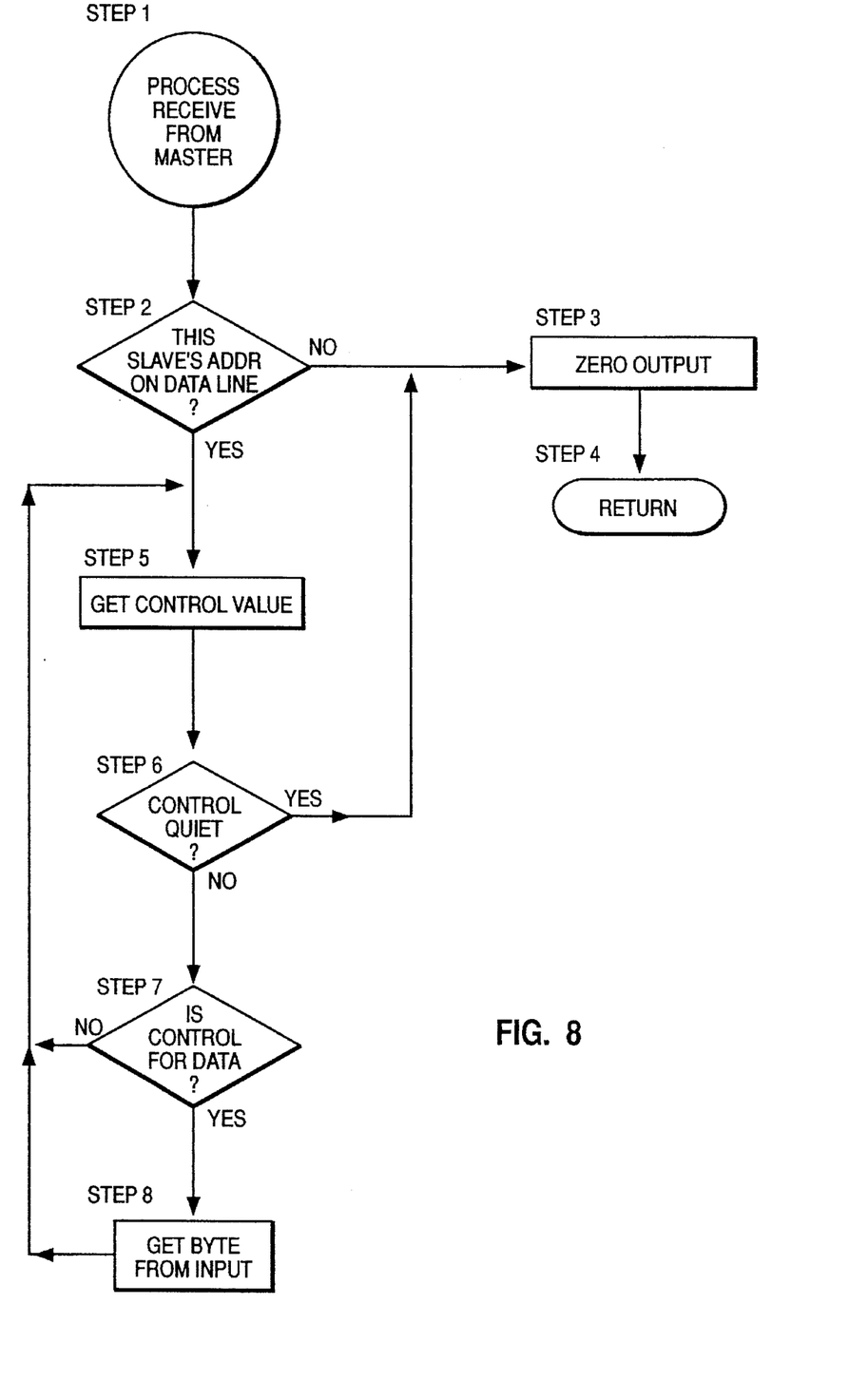
FIG. 8 is another flowchart illustrating the process whereby a slave system receives information from the LAN.
Figure 9:
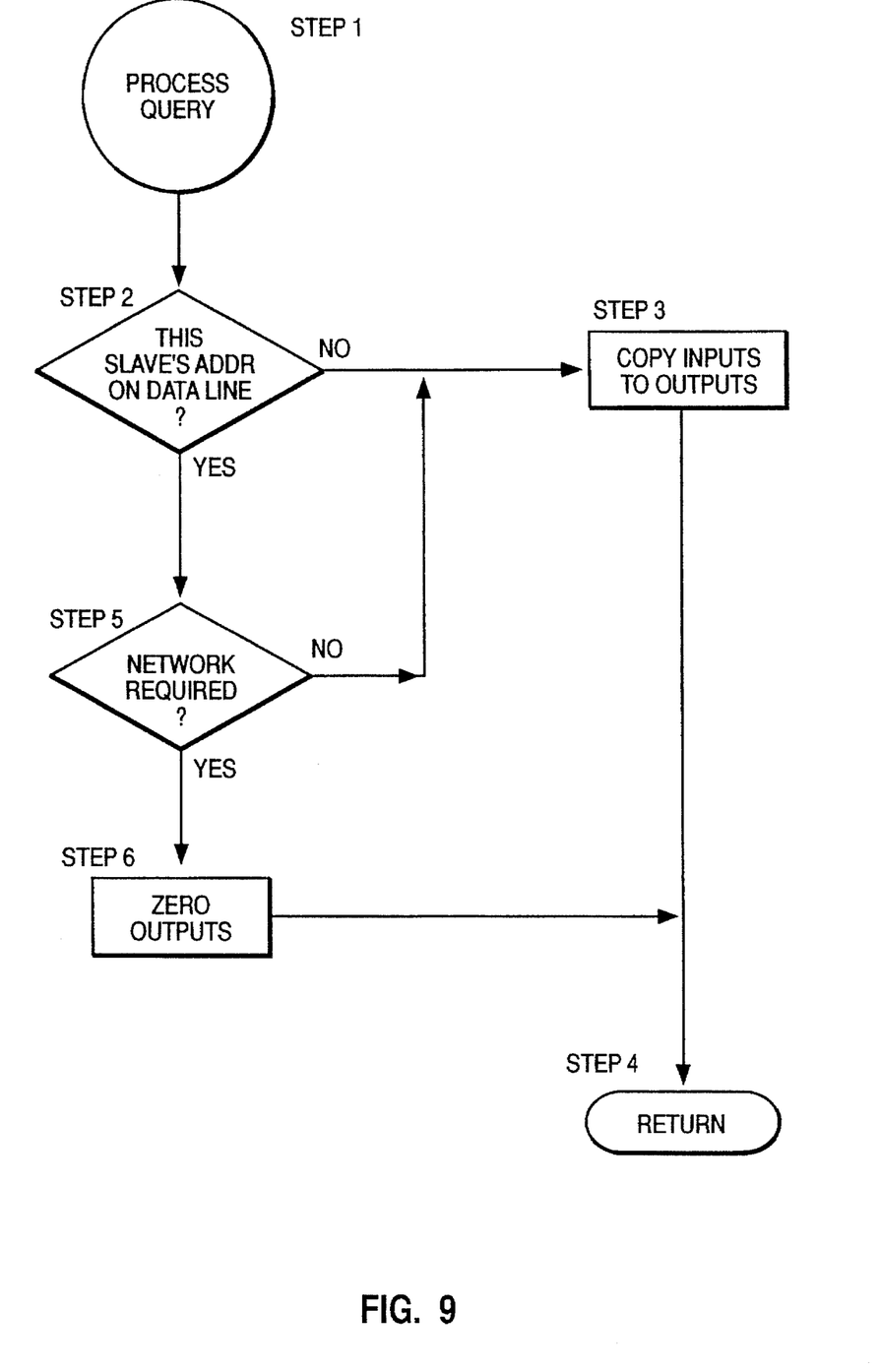
FIG. 9 is a another flowchart showing the process which is used by the master to determine if the network is required by any slave system(s)

FIG. 8 is a flowchart representing the data receive process routine of step 11 of FIG. 7. In this process the slaves are in receive mode, but only the slaves selected remain in receive mode, while all the rest return to a state where they monitor the network. At step 1, the process is started and step 2 determines if the data on the network is for this particular slave. If not, then the slave places zero output on the network (step 3) and returns to the flowchart of FIG. 7 at step 4. If the data on the network is for this slave, then the slave gets the control value at step 5. If the control value is quiet, then the process returns to step 3. If the control value is active, then step 7 determines if the control value represents data to be received, and if so, a byte of data is retrieved from the input to the slave system. If the control value is not for data, or subsequent to step 8, the process returns to step 5 wherein the control value is obtained. The process loops through steps 5–8 until each byte of data from the network is received by this particular slave system.

FIG. 9 is the query process represented at step 7 of FIG. 7 which is the protocol for communicating on the network. In this process the master system is querying to see if any slave wants the network. The master queries each slave individually to determine if the slave desires to send data to the master, or another slave. The process is started at step 1 and at step 2 it is determined if the data on the network is the address for this particular slave, if not the steady state condition of copying data and control values directly from the slave input to the slave output is maintained at step 3. The process then returns to the overall slave system flowchart of FIG. 7 at step 4. If step 2 determines that the data is the address for this particular slave, then step 5 finds whether ownership of the network is required. If not, the process returns to the steady state condition at step 3. However, if the network is required the slave system ceases the steady state condition by not copying inputs to outputs and instead puts zero output on the network (step 6). After step 6, the process returns at step 4 to the flowchart of FIG. 7.

Figure 10:
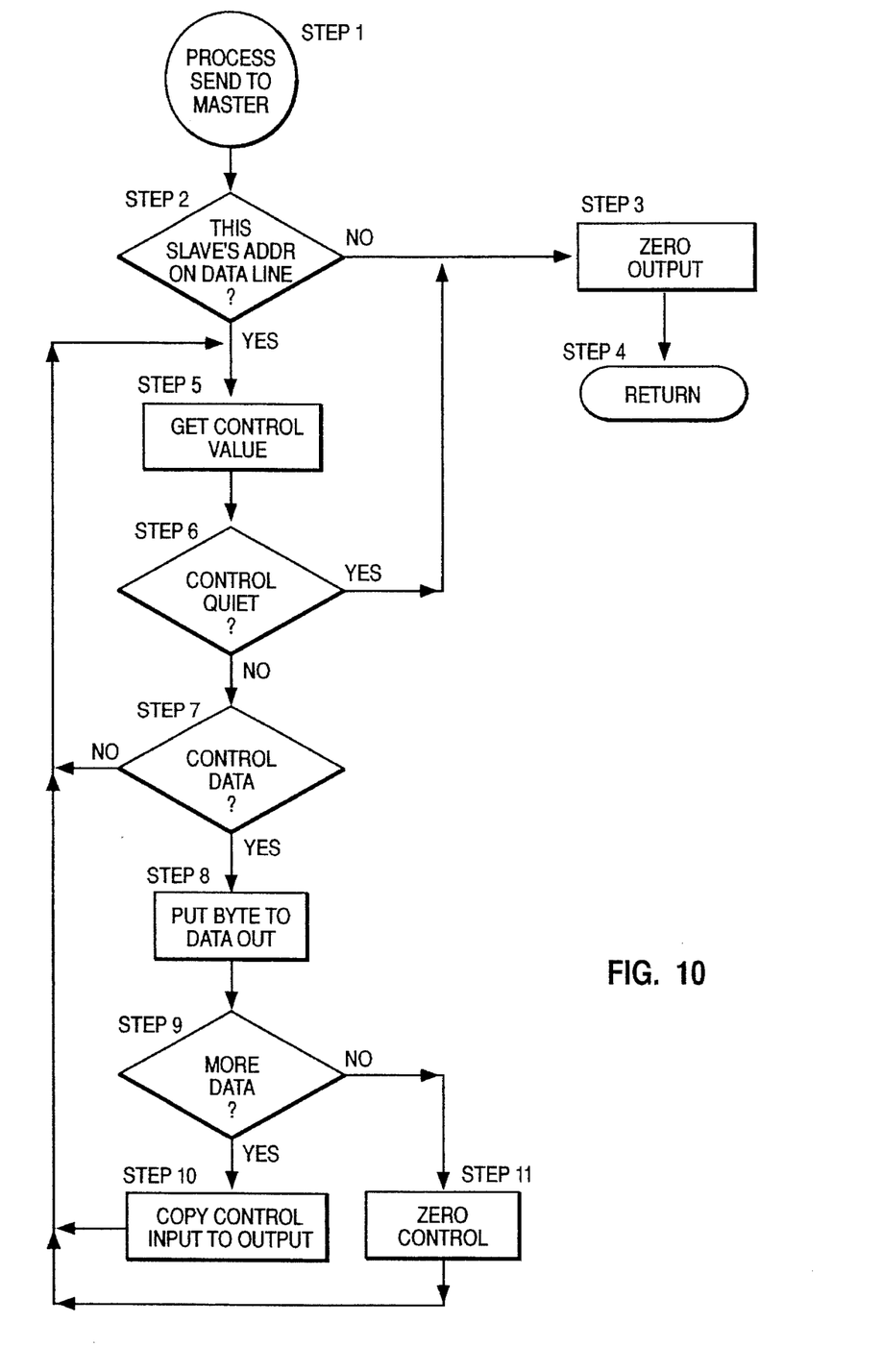
FIG. 10 is a flowchart of the steps required when a slave system sends information over the LAN to the master, or another slave.

Referring to FIG. 10, the process whereby a slave sends data to the master is shown. At step 1 the process is started and step 2 determines if the data specifies this slave's address. If not the system continues to step 3 where no output is placed on the network by the slave. At step 4 the process returns to the flowchart of FIG. 7. If the data specifies the address for this slave then the control value is obtained at step 5 and step 6 determines if the control value is quiet, i.e. the master has stopped the transmission from the slave to the master. If the control value is quiet, then the process loops back to step 3 where the output value is zero. If it is determined at step 7 that the control value is not associated with data, then the process loops back to step 5. However if there is data for the control value, a byte of data is placed on the network from the slave output, at step 8. It is then determined at step 9 if there is more data to output, and if so, the input to the slave is directly copied to the output at step 10. If there is no more data to output, then no control values are output (step 11). The absence of control values output on the channel (zero control), signals the master that there is no more data to be sent from the slave to the master. Subsequent to both steps 10 and 11, the process returns to step 5 where a new control value is obtained.

Figure 11:
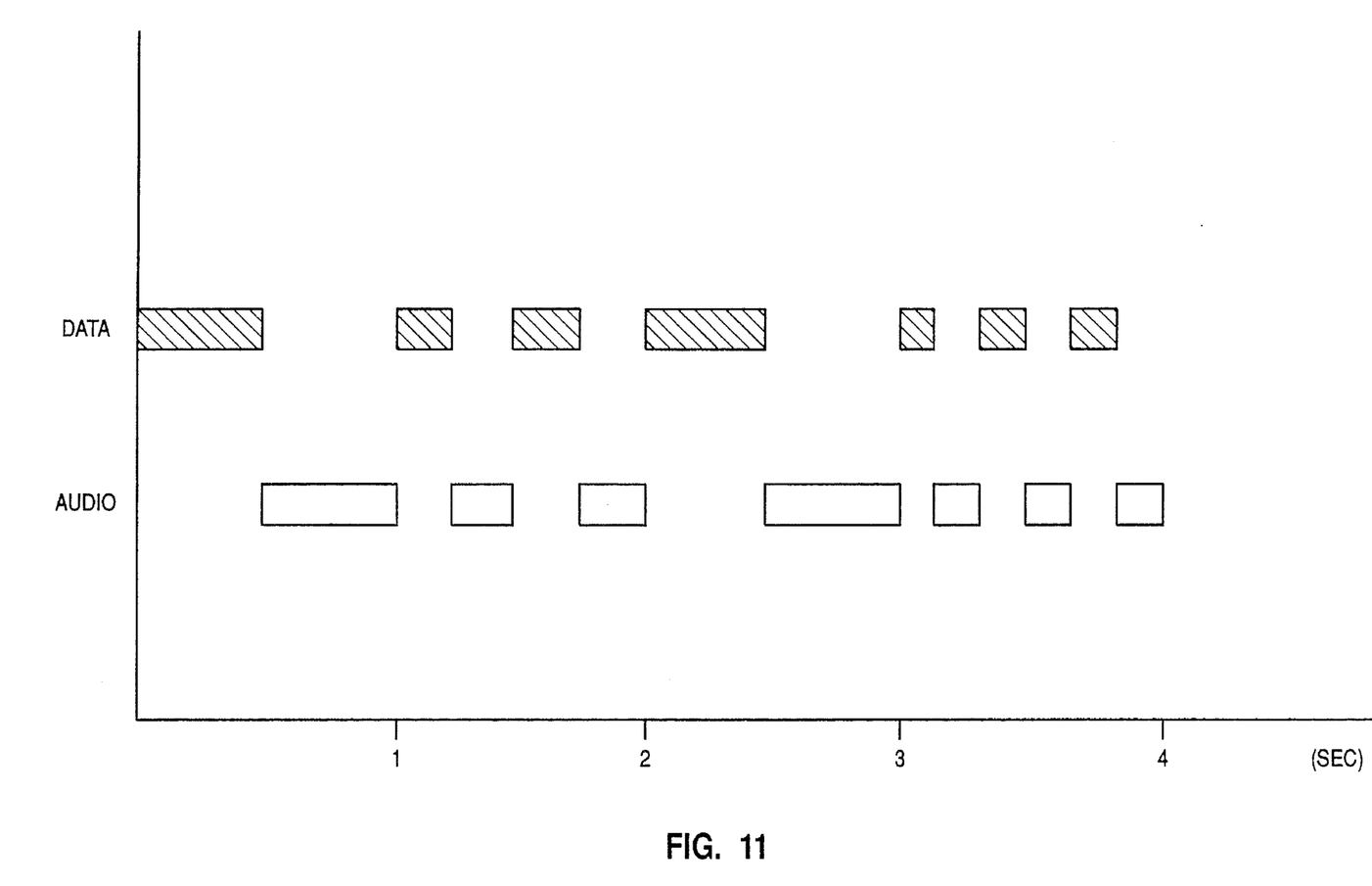
FIG. 11 is a graph illustrating how the data and audio information packets are simultaneously transmitted over the network of the present invention.

FIG. 11 is a graph showing the method by which the present invention is capable of transferring audio information and data simultaneously. For each sampling period a system (either master or slave) of the present invention connected to the audio LAN, alternately transmits or receives a specific amount of audio information and data. This is accomplished by the multitasking capability of the DSP 219 and its corresponding software (operating system 332). For example, assume each sampling period is one second. During the first time period (one second), 0.5 seconds of data and 0.5 seconds of audio are alternately transferred. The data and audio may be buffered and compressed such that no gaps in the played audio will be heard. In the second period 0.25 seconds of data and audio are transferred. The third period is identical to the first period wherein 0.5 seconds of data and audio are transferred. However, in period 4, 0.16 seconds of data and audio are alternately transferred. In the system of the present invention, a sampling frequency of 11.025 KHZ may be used. Thus, even though the data and audio information are alternately sampled and provided to a user, the user perceives that both pieces of information are being received in real time. That is, there is no apparent delay in the audio information, or data that is being perceived by a user of either the master system, or any slave system of the present invention connected using the disclosed audio LAN.

Although certain preferred embodiments have been shown and described, it should be understood that many changes and modifications may be made therein without departing from the scope of the appended claims.

For example, the network could also be made wireless with appropriate external circuitry by use of an infrared transmitter/receiver.

We claim:

1. A computer network including a master system having a first audio card and multiple slave systems each having substantially identical second audio cards, comprising:

means for commonly interconnecting first and second substantially identical analog format audio channels on said first audio card with respective first and second substantially identical analog format audio channels of said second audio cards in the multiple slave systems;

communication means for controlling the transfer of audio and data information between said master system and said slave systems using said first audio channel to communicate control information and said second audio channel to communicate said audio and data information; and means for simultaneously processing said audio and data information in said first and second audio cards.

2. A system according to claim 1 wherein said communication means comprises means, within said master system for outputting a clock signal to said multiple slave systems.

3. A system according to claim 2 wherein said communication means further comprises:

means, within said slave systems, for receiving said clock signal from said master system; and means, within said slave systems, for outputting said clock signal to said master to maintain a steady state condition.

4. A system according to claim 3 wherein said communication means further comprises means, within said slave systems, for withholding the output of said clock signal to said master to request access to said network.

5. A system according to claim 4 wherein said communication means further comprises:

means, within said master for determining which of said slave systems has requested access to said network; and means, within said master for granting access to said network to the requesting slave system.

6. A system according to claim 5 wherein said communication means further comprises means, within said requesting slave system for transferring data to either said master system or another one of said slave systems.

7. A system according to claim 6 wherein said communication means further comprises means, within said master for transferring data to said requesting slave system.

8. A system according to claim 7 wherein said communication means further comprises:

means, within said master, for revoking access to said network by said requesting slave system; and means for granting access to another of said slave systems requesting access to said network.

9. A system according to claim 8 wherein said means for simultaneously processing comprises a multitasking central processing system included on each of said audio cards.

10. A method of communicating audio information and data information between a master computer system having a first audio card and multiple slave computer systems each having substantially identical second audio cards, comprising the steps of:

commonly interconnecting first and second substantially identical analog format audio channels on said first audio card with respective first and second substantially identical analog format audio channels of said second audio cards in the multiple slave systems;

controlling the transfer of audio and data information between said master system and said slave systems using said first audio channel to communicate control information and said second audio channel to communicate said audio and data information; and simultaneously processing said audio and data information in said first and second audio cards.

11. A method according to claim 10 wherein said step of controlling comprises the step of outputting, by said master system, a clock signal to said multiple slave systems.

12. A method according to claim 11, wherein said step of controlling further comprises the steps of:

receiving, by said slave systems, said clock signal from said master system; and outputting, by said slave systems, said clock signal to said master to maintain a steady state condition.

13. A method according to claim 12 said step of controlling further comprises the step of withholding, by said slave systems, the output of said clock signal to said master to request access to said network.

14. A method according to claim 13 wherein said step of controlling further comprises the steps of:

determining, by said master, which of said slave systems has requested access to said network; and granting, by said master, access to said network to the resting slave system.

15. A method according to claim 14 wherein said step of controlling further comprises the step of transferring, by said requesting slave system, data to either said master system or another one of said slave systems.

16. A method according to claim 15 (wherein said step of controlling further comprises the step of transferring, by said master, data to said requesting slave system.

17. A method according to claim 16 wherein said step of controlling further comprises the steps of:

revoking, by said master, access to said network by said requesting slave system; and granting access to another of said slave systems requesting access to said network.

\* \* \* \* \*